US007684908B1

(12) United States Patent
Ogilvie et al.

(10) Patent No.: US 7,684,908 B1

(45) Date of Patent: Mar. 23, 2010

(54) VEHICLE IDENTIFICATION KEY FOR USE BETWEEN MULTIPLE COMPUTER APPLICATIONS

(75) Inventors: Terry Ogilvie, San Jose, CA (US); Walter Sasaki, Morgan Hill, CA (US); James Cancilla, San Jose, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 906 days.

(21) Appl. No.: 11/024,000

(22) Filed: Dec. 29, 2004

(51) Int. Cl.
*G01M 17/007* (2006.01)

(52) U.S. Cl. .......................................... 701/32; 701/35

(58) Field of Classification Search .................... 701/32
See application file for complete search history.

(56) References Cited

U.S. PATENT DOCUMENTS

| | | | | |
|---|---|---|---|---|
| 5,491,631 | A * | 2/1996 | Shirane et al. | 701/35 |
| 5,991,673 | A | 11/1999 | Koopman, Jr. et al. | |
| 6,141,608 | A * | 10/2000 | Rother | 701/33 |
| 6,330,499 | B1 * | 12/2001 | Chou et al. | 701/33 |
| 6,339,736 | B1 * | 1/2002 | Moskowitz et al. | 701/29 |
| 6,615,120 | B1 * | 9/2003 | Rother | 701/33 |
| 6,693,367 | B1 | 2/2004 | Schmeisser et al. | |
| 6,714,846 | B2 | 3/2004 | Trsar et al. | |
| 6,754,564 | B2 | 6/2004 | Newport | |
| 6,778,888 | B2 * | 8/2004 | Cataldo et al. | 701/29 |
| 6,845,307 | B2 * | 1/2005 | Rother | 701/33 |
| 7,085,680 | B2 * | 8/2006 | Huang | 702/183 |
| 7,142,962 | B1 * | 11/2006 | Pflieger et al. | 701/29 |
| 7,209,860 | B2 * | 4/2007 | Trsar et al. | 702/183 |
| 2002/0007237 | A1 * | 1/2002 | Phung et al. | 701/33 |
| 2003/0195681 | A1 * | 10/2003 | Rother | 701/33 |

FOREIGN PATENT DOCUMENTS

JP 9-210868 A 8/1997

* cited by examiner

*Primary Examiner*—Thomas G Black
*Assistant Examiner*—Shelley Chen
(74) *Attorney, Agent, or Firm*—McDermott Will & Emery LLP

(57) ABSTRACT

A vehicle diagnostic system including a processor, a user interface including a display device and an input device both coupled to the processor for interactive control thereof and thereby, and a local storage library connected to the processor for storing at least one application to be performed on a vehicle. The processor is programmed to request vehicle identification information from a user through the display device, create a particular configuration identifier containing the vehicle identification information entered by the user through the input device, store the particular configuration identifier in the local storage library, retrieve at least one application from the library as the application is selected by the user through the input device, and provide the particular configuration identifier to the application.

23 Claims, 5 Drawing Sheets

VEHICLE IDENTIFICATION KEY FOR USE BETWEEN MULTIPLE COMPUTER APPLICATIONS

CROSS-REFERENCE TO RELATED APPLICATION

The present application is related to co-pending U.S. patent application Ser. No. 11/025,369, filed on Dec. 29, 2004, and entitled "Method, Apparatus, and System for Accessing Multiple Vehicle-Information Databases Using a Handheld Vehicle Diagnostic Tool", which is assigned to the assignee of the present application and incorporated herein by reference, and which names Sunil Reddy, Dale Trsar and James Cancilla (an inventor of the present application) as inventors.

FIELD OF THE DISCLOSURE

This disclosure relates generally to test and diagnostic systems for machines or other operating apparatus and, more specifically, to a motor vehicle diagnostic system including or having access to, multiple computer applications, and including a vehicle identification key for seamless connection between the multiple applications.

BACKGROUND OF THE DISCLOSURE

Modern vehicles include various electronic control units, such as microprocessors and controllers, that are programmed to control vehicle operations. Such control units include, for example, an Electronic Control Module (ECM) or on-board computer. The control units are designed to monitor the operation of various electronic components and electronics in order to optimize vehicle performance. For example, control units such as an ECM can monitor the amount of carbon monoxide in the engine exhaust and adjust the fuel/air ratio entering the cylinders in order to optimize combustion efficiency.

The control units also store historical data of the performance of the vehicle systems. The data can be accessed by a user through an information port. Diagnostic systems are commonly used to obtain (and sometimes transmit) data through the information port, and the diagnostic systems can be used to monitor and adjust the operation of various systems of the vehicle, detect malfunctions, and record error codes produced by the control units.

Traditional diagnostic systems include a computer that couples to the information port by means of a data cable, a monitor, and a keyboard. An example of such a traditional diagnostic system is a computerized diagnostic station including a personal computer having a monitor and keyboard. Smaller, portable diagnostic systems are also now available. For example, U.S. Pat. No. 6,693,367, which is assigned to the assignee of the present application, shows a portable, hand-held vehicle diagnostic display unit that is configured such that a user can simultaneously lift and operate the diagnostic display unit with a single hand.

Some diagnostic systems include libraries, or databases. U.S. Pat. No. 6,141,608, which is assigned to the assignee of the present application, for example, discloses such a system. The system stores libraries of information regarding vehicle identifications, drivability symptoms exhibited by vehicles, vehicle system and component tests and service codes which can be registered by the vehicle on-board computer. System software permits the user to input an identification of the vehicle under test and, in one mode of operation, displays a library of faults, such as symptoms or service codes, from which the user can select those exhibited by the vehicle, whereupon the system selects from the test library those tests pertinent to diagnosis of the causes of the selected faults and displays them in a hierarchically ranked order based on likelihood of successful diagnosis of the faults. The user can then select and initiate any displayed test. In other modes, the system initially displays one of the libraries of system or component tests, from which the user selects those deemed appropriate, whereupon the system highlights icons which can be selected for initiating pertinent test procedures. Selected test procedures may include links to the engine analyzer or scanner hardware or other appropriate test modules.

U.S. Pat. No. 6,714,846, which is also assigned to the assignee of the present application, discloses a diagnostic director. The diagnostic director includes a host system, which can comprise for example, the portable, hand-held vehicle diagnostic display unit disclosed in U.S. Pat. No. 6,693,367. The host system includes a processor, storage media, and a plurality of support data sources, which may be resident at or remote from the host system. The storage media stores service or maintenance test designations and descriptions. System software responds to user selection of displayed vehicle systems or symptoms to be diagnosed by displaying test applications. Upon user selection of a test application, the system displays the first page of the test application and simultaneously links to appropriate support data sources and displays pertinent support data on a portion of the display screen. Vehicle information, such as the make, model, year, and engine size of the vehicle.

What is still desired is a new and improved motor vehicle diagnostic system including or having access to multiple computer applications for conducting various tests of the vehicle. The diagnostic system will preferably include features which allow multiple test applications to be opened and run in a more convenient and seamless manner while testing and diagnosing a vehicle.

SUMMARY OF THE DISCLOSURE

The present disclosure provides a vehicle diagnostic system including a processor, a user interface including a display device and an input device both coupled to the processor for interactive control thereof and thereby, and a local storage library connected to the processor for storing at least one application to be performed on the vehicle. The processor is programmed to request vehicle identification information from a user through the display device, create a particular configuration identifier (which also may be referred to as a vehicle identification key) containing the vehicle identification information entered by the user through the input device, store the particular configuration identifier in the local storage library, retrieve at least one application from the library as the application is selected by the user through the input device, and provide the particular configuration identifier to the application.

Among other features and benefits, the present disclosure provides a motor vehicle diagnostic system including, or having access to, multiple computer applications, wherein each application may provide a different test or diagnostic function for a vehicle. The diagnostic system includes features which conveniently allow each of the local, or remote, applications to be opened and run from a host unit while testing and diagnosing a vehicle. In addition, the system allows each of the applications to be opened and run from the host unit without requiring vehicle information to be re-entered whenever one of the applications is opened and run.

Additional aspects and advantages of the present disclosure will become readily apparent to those skilled in this art from the following detailed description, wherein only an exemplary embodiment of the present disclosure is shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF AN EXEMPLARY EMBODIMENT OF THE DISCLOSURE

The present disclosure provides a motor vehicle diagnostic system including, or having access to, multiple computer applications, wherein each application may provide a different test or diagnostic function. The diagnostic system includes features which conveniently allow each of the local, or remote, applications to be opened and run from a host unit while testing and diagnosing a vehicle. In addition, the system allows each of the applications to be opened and run from the host unit without requiring vehicle information to be re-entered.

Figure 1:
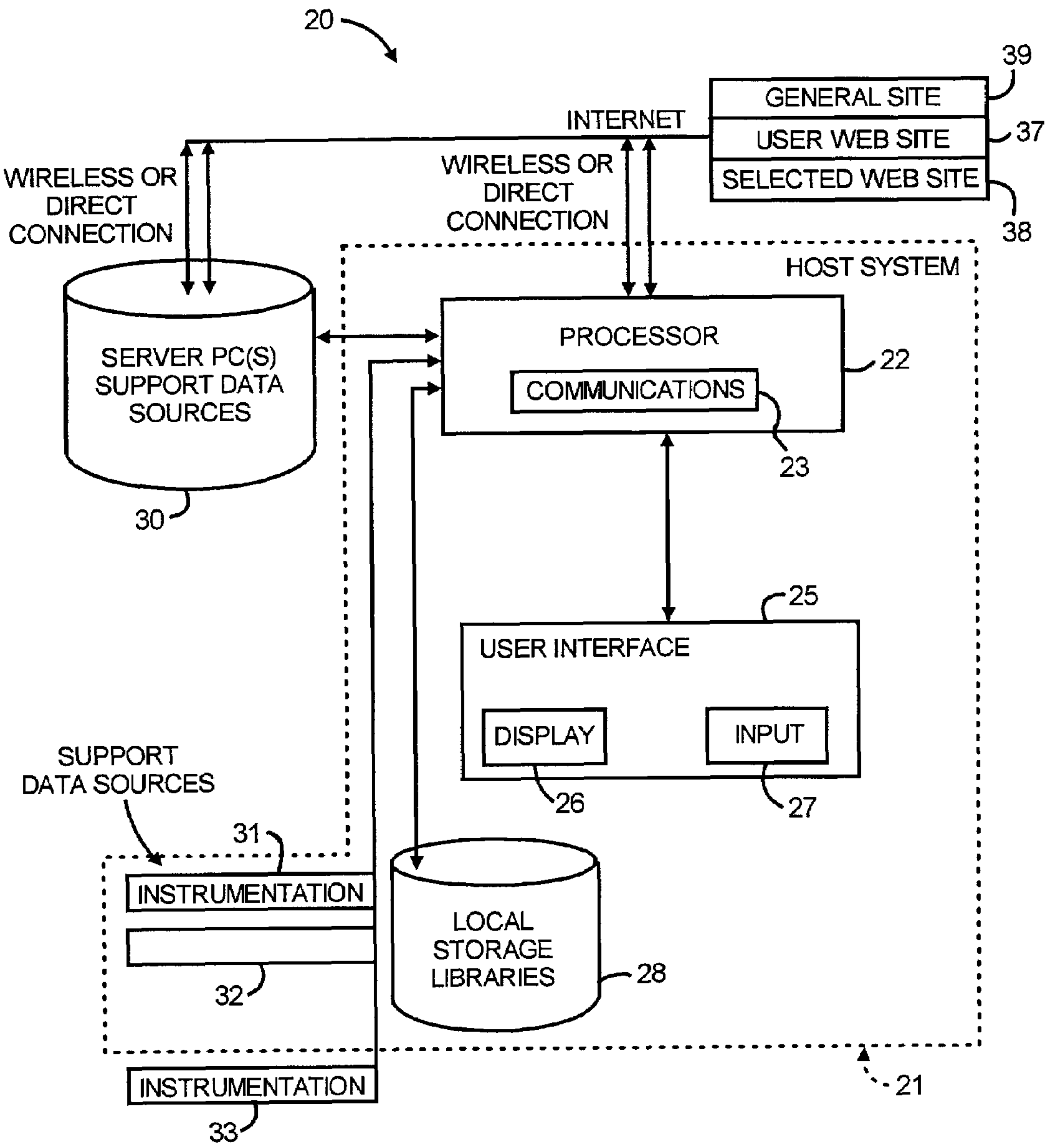
FIG. 1 is a functional block diagram of a diagnostic system constructed in accordance with the present disclosure and including a host system.
Figure 2:
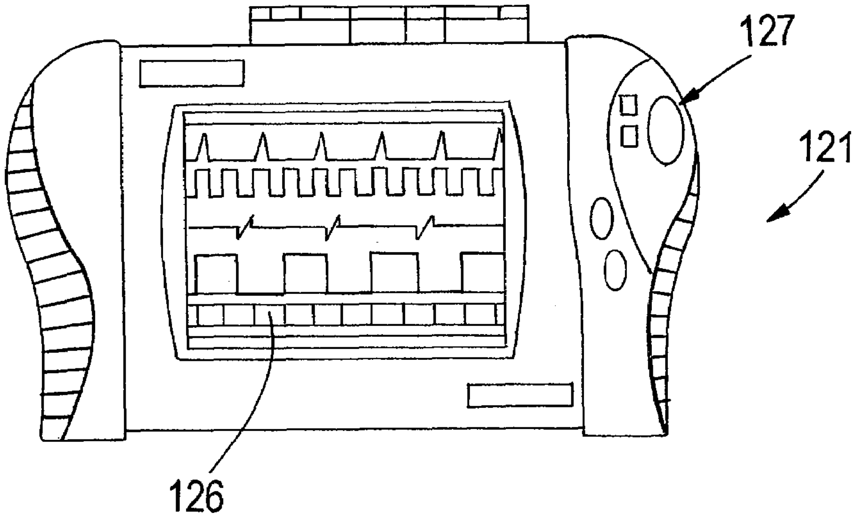
FIG. 2 is a front perspective view of an exemplary embodiment of a diagnostic display unit, which can comprise the host system of FIG. 1.
Figure 3:
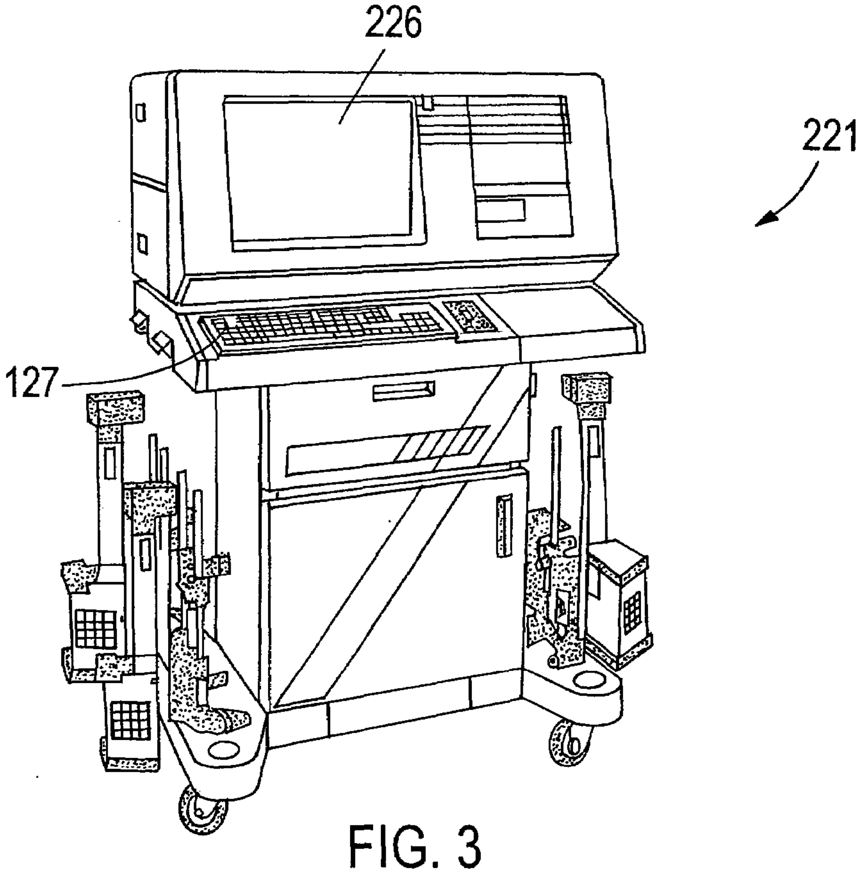
FIG. 3 is a front perspective view of another exemplary embodiment of a diagnostic display unit, which can comprise the host system of FIG. 1.
Figure 4:
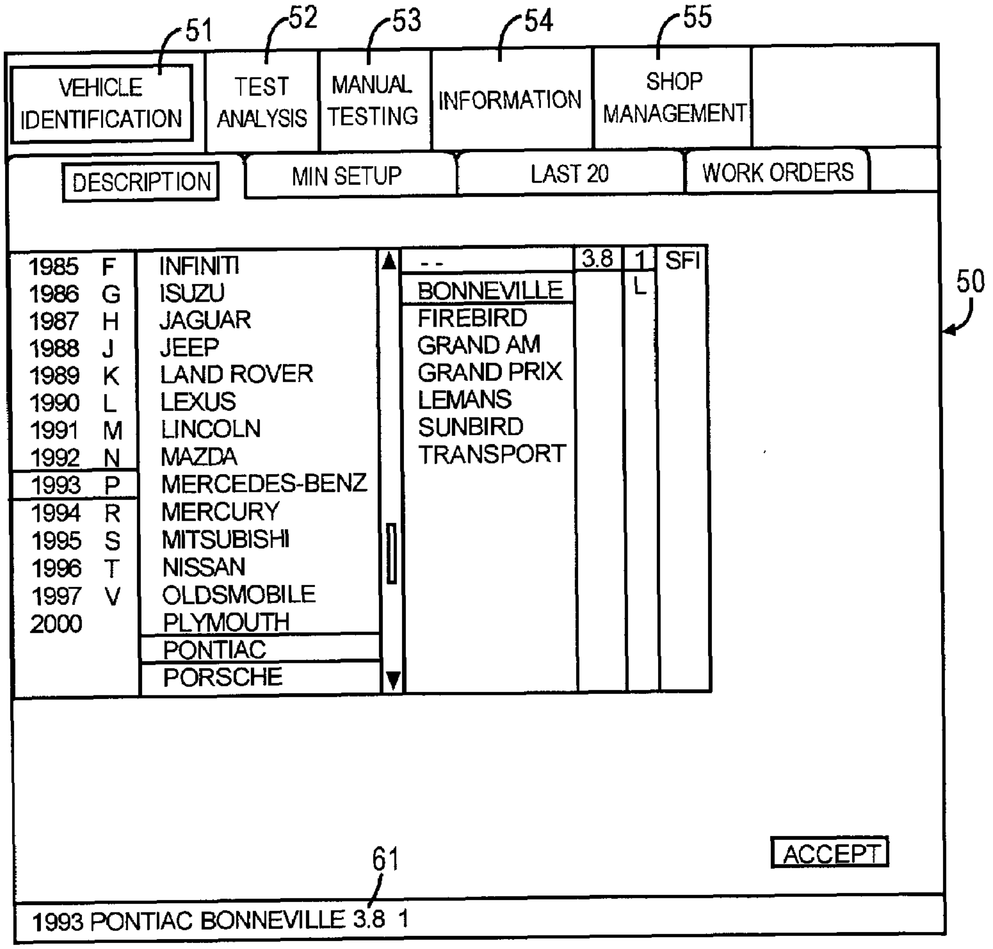
FIG. 4 is an exemplary embodiment of a screen display which may be displayed on the host system of FIG. 1.
Figure 5:
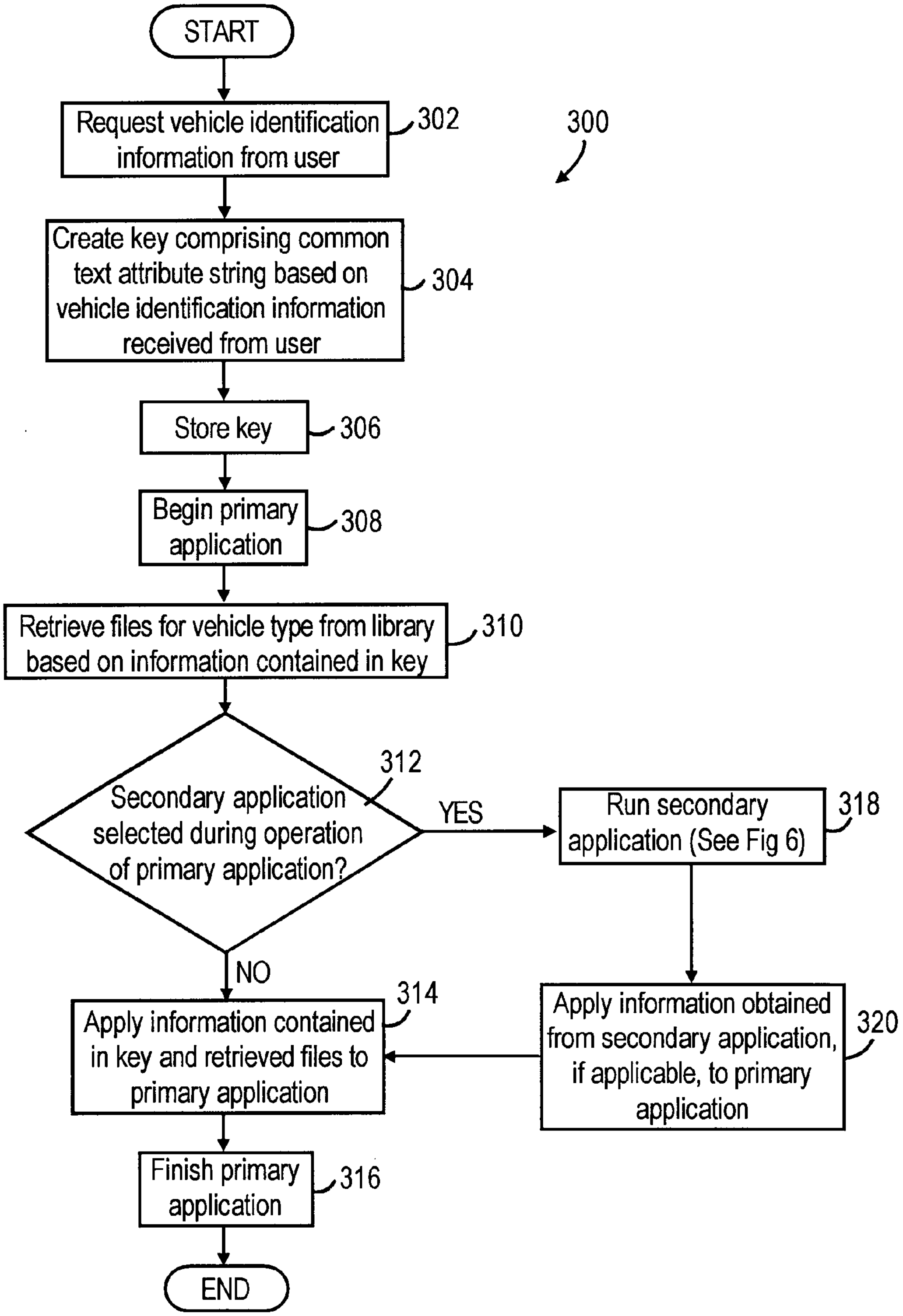
FIGS. 5 and 6 are flow charts illustrating exemplary embodiments of methods according to the present disclosure of operating the system of FIG. 1.
Figure 6:
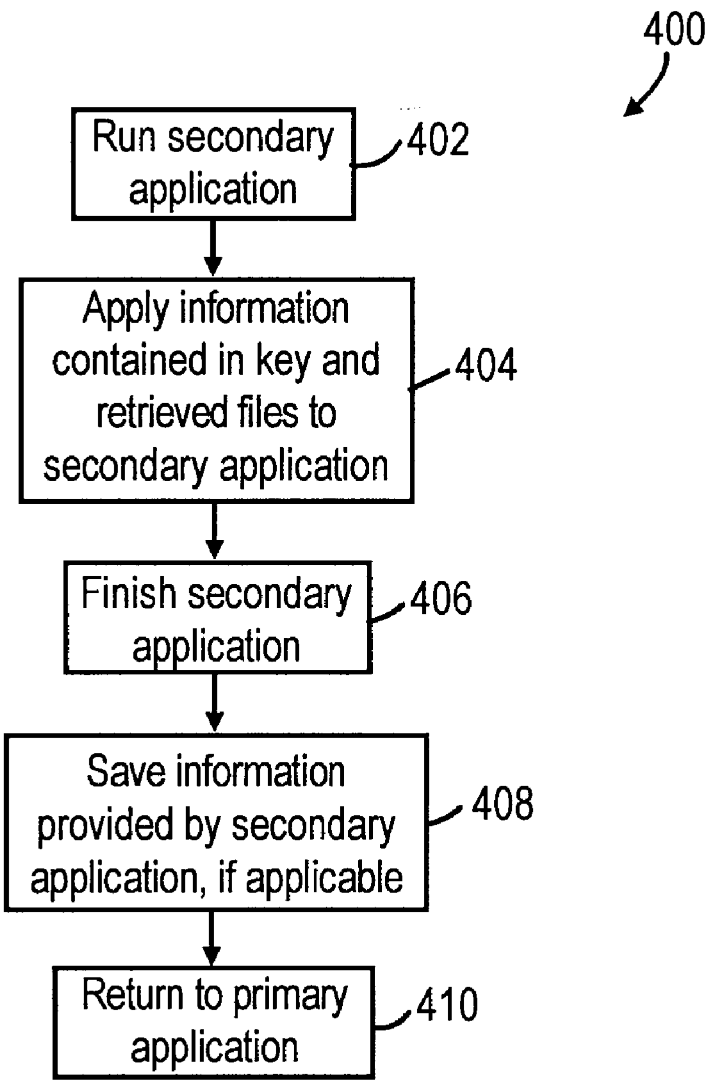

In FIG. 1, there is shown an exemplary embodiment of the diagnostic system 20, including a host system or unit 21. A similar diagnostic system, or diagnostic director, is disclosed in the aforementioned U.S. Pat. No. 6,714,846, which is assigned to the assignee of the present disclosure and incorporated herein by reference. Exemplary embodiments of diagnostic display units 121, 221 that can comprise the host unit of FIG. 1 are shown in FIGS. 2 and 3, respectively. U.S. Pat. No. 6,693,367, which is assigned to the assignee of the present application, shows a portable, hand-held vehicle diagnostic display unit, which is similar to the diagnostic display units 121 shown in FIG. 2. FIG. 4 shows an exemplary embodiment of a screen display 50 which may be displayed on the host system 21, and FIGS. 5 and 6 are flow charts illustrating exemplary embodiments of methods 300, 400 according to the present disclosure of operating the system 20 of FIG. 1.

Referring first to FIG. 1, the diagnostic system 20 includes a host unit 21, which can be a PC-based system, such as the diagnostic display unit 221 shown in FIG. 3, or a hand-held diagnostic system, such as the diagnostic display unit 121 shown in FIG. 2. The host unit 21 includes a processor 22 having communications circuitry 23 to provide communications with associated utilities. The host unit 21 also includes a user interface 25, such as a suitable display 26 and an input device 27. The nature of the display 26 and the input device 27 will vary, depending upon the nature of the host unit 21. Thus, for example, if the host unit 21 is a PC-based system, the display 26 may be a CRT display screen and the input device 27 may be a keyboard and/or mouse, whereas if the host unit 21 is a hand-held diagnostic system, the display 26 may be an LCD display screen and the input device 27 may be a built-in navigational controls or keypad. The diagnostic display units 121, 221 of FIGS. 2 and 3 are similar to the host unit 21 of FIG. 1 such that similar elements have the same reference numeral preceded by a "1" in FIG. 2 and preceded by a "2" in FIG. 3.

Referring to FIG. 1, the host unit 21 includes a local storage utility 28, which will typically include suitable ROM and RAM and, depending upon the nature of the host unit 21, may include a hard drive, a floppy drive, a CD ROM drive and the like. The local storage utility 28 will typically store computer programs for execution by the processor 22 and may also store a knowledge database of the type described in the aforementioned U.S. Pat. No. 6,141,608, which is assigned to the assignee of the present disclosure and incorporated herein by reference. The knowledge database includes libraries of files relating to aspects of a vehicle or other apparatus, the files including fault-based files, which may include, for example, but is not limited to, "Symptoms" and "Service Codes," as well as a "Component/System" file listing various components and subsystems of vehicles or other apparatus which may be tested, as well as a file listing task-based service or maintenance procedures relating to such apparatus. These files are collectively referred to as a "Service Library", and the information items stored thereon may be referred to as "service information items." Also stored in this utility is a "Test Library" of "test information items" relating to procedures which can be utilized to perform selected maintenance or service tasks, test selected components or systems or diagnose selected symptoms. The test information items include test designations and links to test descriptions or instructions.

Still referring to FIG. 1, the processor 22 may also be connected to an external server 30, and may also be connected to one or more instrumentation support data sources, three of which are designated at 31, 32 and 33, although it will be appreciated that any number could be provided. Again, depending upon the nature of the host unit 21, the instrumentation data sources may be resident at the host system, such as sources 31 and 32, or may be external thereto, such as data source 33. Examples of such instrumentation-type data sources are a scanner linked to on-board diagnostics ("OBD"), which may be an on-board monitoring and control device such as an ECU, a graphical/digital volt-ohm meter, a laboratory oscilloscope, various sensors, such as temperature, acoustic and vibration sensors, a frequency meter, a dynamometer, such as a gas analysis dynamometer, an emissions testing bench, and the like.

The processor 22 and/or the server 30 may be adapted to be connected to the Internet, through suitable modems (not shown) or dedicated communication links, in a known manner. As is indicated, these links could be wired or wireless. Similarly, it will be appreciated that other communication links in the system 20, such as the various communication links between the processor 22 and the server 30, the instrumentation data sources 31-33 and the like could, if desired, also be wireless rather than direct-connection, wired links. The processor 21 and/or the server 30 are connectable via the Internet to various remote support data sources, which may be resident at Internet Web sites. These may include a one or more sites 37 proprietary to the user, pre-selected sites or specific pages of sites 38 which have been predetermined to be pertinent to a specific diagnostic test routine, or sites 39 which may be accessed through a browser on an ad hoc basis. It will also be appreciated that other support data sources could, if desired, be resident at the server 30 in suitable storage media.

The non-instrumentation support data sources may include a variety of different text and/or graphics data sources including, for example, but not limited to, manufacturer's diagnostic procedures, such as service manuals, service bulletins or the like, third-party independent diagnostic procedures and manuals, expert diagnostic tips and procedures compiled by a user entity, libraries of component locations, libraries of connectors and connection points, libraries of circuit diagrams and mechanical system diagrams, video libraries, waveform libraries, etc.

As was indicated above, some of the support data sources may include case-based, expert databases or libraries, compiled by technicians and service personnel from actual field diagnostic and service experience. Collection of some of this information may be done automatically, as described, for example, in the aforementioned U.S. Pat. No. 6,141,608. The library of diagnostic tests, described above as included in the local storage utility 28, may also be generated from actual field experience, as well as other sources.

All of the aforementioned applications, diagnostic tests, and libraries may also be provided on portable forms of computer-readable medium, such as a floppy disk or a CD-ROM. The term "computer-readable medium" as used herein refers to any medium that participates in providing instructions to the processor 21 for execution. Such a medium may take many forms, including but not limited to, non-volatile media, volatile media, and transmission media. The local storage utility 28 is a computer-readable media, for example. Methods in accordance with the present disclosure of operating the system 20 of FIG. 1 can be provide as computer programs on computer-readable medium for execution by the processor 21.

Referring now to FIG. 4, an exemplary embodiment of a screen display, which may be displayed on the display 26 of the host unit 21 of FIG. 1 to implement a vehicle identification procedure, is shown. Any use of the host unit 21 starts with the vehicle identification procedure for the vehicle to be diagnosed. The display screen 50 has arrayed across the top thereof a series of icons 51-55, respectively designated "Vehicle Identification", "Test/Analysis", "Manual Testing", "Information", and "Shop Management."

For purposes of implementing the vehicle identification procedure, the icon 51 is selected, bringing up the screen display shown in FIG. 4. The system presents the user with a number of questions or fields, such as model year, make, model name, engine size and the like, each field presenting the user with a menu of unique values from within that field from which the user may select. The user makes a selection for that field in a well-known manner, such as by use of the mouse and keyboard, and the value is added to the database search key. FIG. 4 illustrates several such fields and the menus associated therewith. If a menu exceeds the length of its associated display window, the menu can be scrolled in a known manner by use of a scroll bar icon. The system is dynamic as to the number of questions the user must answer to identify the vehicle, allowing the user to identify the vehicle without having to answer any unnecessary questions. In order to perform system diagnostics, the vehicle identification must have resolution to at least the year, make, model, engine size, engine code, fuel type, ignition type and air measurement type for the vehicle. The vehicle identification may also include at least a part of a Vehicle Identification Number (VIN). During run time, if additional vehicle information is needed to perform a selected test, the system will so indicate and present the user with the appropriate fields and menus to enter the needed information. The vehicle type is indicated at the bottom of the screen display 50, as at 61.

As the vehicle identification procedure is carried out, the processor 22 of the host unit 21 is programmed to save the vehicle information as a particular configuration identifier (which also may be referred to as a vehicle identification key), such that the particular configuration identifier can automatically be provided to any of the local or remote applications that are opened and run from the host unit 21 while testing and diagnosing a vehicle. Accordingly, each application can be opened and run from the host unit 21 without requiring vehicle information to be re-entered by the user. According to one exemplary embodiment, the particular configuration identifier comprises a common text attribute string. The particular configuration identifier may also include at least a part of a Vehicle Identification Number (VIN).

FIGS. 5 and 6 are flow charts illustrating exemplary embodiments of methods 300, 400 according to the present disclosure of operating the system 20 of FIG. 1. The processor 22 of the host unit 21 is programmed to carry out these methods 300, 400. The method 300 of FIG. 5 includes first requesting vehicle identification data from the user, as shown at 302. Then the processor 22 creates and stores a particular configuration identifier comprising vehicle identification information received from the user, as shown at 304 and 306. As shown in 304, the key can comprise a common text attribute string. The key may be stored in the local storage library 28 of the host system 21.

The processor 22 of the host unit 21 is then programmed to start the application, as shown at 308. The application can be retrieved from the local storage library 28 or from one of the web sites 37, 38, 39 or the remote server PC 30. In the figure, the application is described as a primary application. This term is used simple to indicate that more than one application can be used by the processor 22. The applications may be opened and closed successively, or a secondary application may be opened while the primary application is opened. In any event, the processor is programmed to provide the particular configuration identifier to each application so that the vehicle information does not have to be re-entered by the user for each application.

At 310 in FIG. 5, the processor is programmed to retrieve appropriate files from the local storage library 28 or from one of the web sites 37, 38, 39 or the remote server PC 30 based upon the needs of the application and the information contained in the particular configuration identifier. If a secondary application is not selected by the user during the operation of the primary application, as shown at 312, then the information contained in the particular configuration identifier and the retrieved files (e.g., manufacturer's diagnostic procedures, such as service manuals, service bulletins or the like, third-party independent diagnostic procedures and manuals, expert diagnostic tips and procedures compiled by a user entity, libraries of component locations, libraries of connectors and connection points, libraries of circuit diagrams and mechanical system diagrams, video libraries, waveform libraries, etc.) is applied to the primary application and the primary application is finished, as shown at 314 and 316. The method 300 of FIG. 5 can be applied to each multiple (primary) applications that are run successively.

If, at 312, a secondary application is selected by the user during the operation of the primary application, then the secondary application is run, as shown at 318, and any information obtained from the secondary application is then applied to the primary application, as shown at 320, if that information is applicable to the primary application. Running the second application is shown in FIG. 6. The method 400 of FIG. 6 includes is applying the information contained in the particular configuration identifier and the retrieved files to the secondary application and finishing the secondary application, as shown at 404 and 406. Any information provided by the secondary application is saved, as shown at 408, and the processor then returns to the primary application, as shown at 410. The methods 300, 400 of FIGS. 5 and 6 can be applied to multiple secondary applications that are run concurrently during the running of a primary application.

The present disclosure, therefore, provides a new and improved motor vehicle diagnostic system that allows applications to be opened and run from a host unit without requiring vehicle information to be re-entered whenever one of the applications is used.

The specific methods and apparatus described in this specification have been presented by way of illustration rather than limitation, and various modifications, combinations and substitutions may be effected by those skilled in the art without departure either in spirit or scope from this disclosure in its broader aspects and as set forth in the appended claims. All methods and apparatus disclosed herein, and all elements thereof, are contained within the scope of at least one of the following claims. No elements of the presently disclosed methods and apparatus are meant to be disclaimed.

What is claimed is:

1. A vehicle diagnostic system comprising:

a processor;

a user interface including a display device and an input device both coupled to the processor for interactive control thereof and thereby; and a storage library connected to the processor for storing a plurality of applications to be performed on a vehicle;

wherein the processor is programmed to, request vehicle identification information from a user through the display device, create a particular configuration identifier containing the vehicle identification information entered by the user through the input device, store the particular configuration identifier in the storage library, retrieve a primary application from the library as the application is selected by the user through the input device, and provide the particular configuration identifier from the library to the primary application;

retrieve a secondary application from the library as the application is selected by the user through the input device, and provide the particular configuration identifier from the library to the secondary application;

wherein the primary application and the secondary application each perform concurrently a different test or diagnostic function on the vehicle.

2. The system of claim 1, wherein the particular configuration identifier comprises a common text attribute string.

3. The system of claim 1, wherein the particular configuration identifier comprises a manufacturer, a year of manufacture, a model and an engine size.

4. The system of claim 1, wherein the particular configuration identifier comprises at least a part of a Vehicle Identification Number (VIN).

5. The system of claim 1, wherein the processor is further programmed to apply information obtained from the secondary application to the primary application.

6. The system of claim 1, wherein the storage library also stores at least one of service information items relating to vehicles, reference information items relating to vehicles, vehicle service manuals, an expert database compiled from prior experience in servicing and diagnosing vehicles, and test information items relating to applications which can be performed on the vehicle, and the processor is further programmed to retrieve items from the library based upon the particular configuration identifier.

7. The system of claim 1, wherein the processor, user interface, and storage library are provided as part of a host unit, and the system further comprises at least one remote server connected to the host unit and storing at least one of an application to be performed on vehicles, service information items relating to vehicles, reference information items relating to vehicles, test information items relating to the applications which can be performed on vehicles, and wherein processor of the host unit is programmed to retrieve data from the remote server based upon user input, the applications selected, and the particular configuration identifier.

8. The system of claim 7, wherein the host unit comprises a diagnostic tool selected from the group of diagnostic tools consisting of a handheld diagnostic tool, a scanning tool, a laboratory oscilloscope, an ignition scope, a five-gas analyzer, a personal digital assistant adapted for diagnostics, a cellular telephone adapted for diagnostics, and a computer adapted for diagnostics.

9. The system of claim 7, wherein the user interface of the host unit comprises a data port for connection to a vehicle electronic control module for receiving the vehicle identification information.

10. The system of claim 7, wherein the remote server resides at an Internet Web site.

11. The system of claim 7, further comprising means for providing wireless communication between at least one of the remote servers and the processor.

12. A method of operating a vehicle diagnostic system, comprising:

requesting vehicle identification information from a user through a display device;

creating and storing a particular configuration identifier containing the vehicle identification information entered by the user through the input device in a storage library;

running a primary application and a secondary application selected by the user through the input device; and providing the particular configuration identifier to the primary and secondary applications from the library;

wherein the primary application and the secondary application each perform concurrently a different test or diagnostic function on the vehicle.

13. The method of claim 12, wherein the particular configuration identifier comprises a common text attribute string.

14. The method of claim 12, wherein the particular configuration identifier comprises a manufacturer, a year of manufacture, a model and an engine size.

15. The method of claim 12, wherein the particular configuration identifier comprises at least a part of a Vehicle Identification Number (VIN).

16. The method of claim 12, wherein information obtained from the secondary application is applied to the primary application.

17. The method of claim 12, further comprising retrieving files for vehicle type from a library based upon the particular configuration identifier.

18. The method of claim 17, wherein the retrieved files are applied to the application.

19. A computer-readable medium carrying one or more sequences of instructions which, when executed by a processor of a vehicle diagnostic system, cause the processor to:

request vehicle identification information from a user;

create and store a particular configuration identifier containing the vehicle identification information in a storage library;

run a primary application and a secondary application selected by a user; and provide the particular configuration identifier to the primary application and the secondary application from the library;

wherein the primary application and the secondary application each perform concurrently a different test or diagnostic function on the vehicle.

20. The medium of claim 19, wherein the particular configuration identifier comprises a common text attribute string.

21. The medium of claim 20, wherein the particular configuration identifier comprises a manufacturer, a year of manufacture, a model and an engine size.

22. The medium of claim 20, wherein the particular configuration identifier comprises at least a part of a Vehicle Identification Number (VIN).

23. The medium of claim 19, wherein information obtained from the secondary application is applied to the primary application.

* * * * *